US008661549B2

(12) United States Patent
Chevallier-Mames et al.

(10) Patent No.: US 8,661,549 B2
(45) Date of Patent: Feb. 25, 2014

(54) METHOD AND APPARATUS FOR OBFUSCATING PROGRAM SOURCE CODES

(75) Inventors: Benoit Chevallier-Mames, Paris (FR); Mathieu Ciet, Paris (FR); Thomas Icart, Paris (FR); Augustin J. Farrugia, Los Altos, CA (US); Bruno Kindarji, Paris (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/411,099

(22) Filed: Mar. 2, 2012

(65) Prior Publication Data

US 2013/0232578 A1    Sep. 5, 2013

(51) Int. Cl.
| G06F 7/04 | (2006.01) |
| G06F 17/30 | (2006.01) |
| H04N 7/16 | (2011.01) |
| G06F 21/10 | (2013.01) |
| G11B 20/00 | (2006.01) |

(52) U.S. Cl.
CPC .......... *G06F 21/10* (2013.01); *G11B 20/00086* (2013.01); *G11B 20/0021* (2013.01)
USPC .............................................. 726/26; 726/22

(58) Field of Classification Search
None
See application file for complete search history.

(56) References Cited

U.S. PATENT DOCUMENTS

| 6,668,325 | B1 * | 12/2003 | Collberg et al. ................ 726/26 |
| 7,054,443 | B1 | 5/2006 | Jakubowski et al. |
| 7,587,616 | B2 | 9/2009 | Jakubowski |
| 7,620,987 | B2 | 11/2009 | Shelest et al. |
| 8,347,398 | B1 * | 1/2013 | Weber .............................. 726/26 |
| 2008/0222734 | A1 * | 9/2008 | Redlich et al. .................. 726/26 |
| 2009/0077664 | A1 * | 3/2009 | Hsu et al. ......................... 726/24 |
| 2009/0119515 | A1 * | 5/2009 | Nicolson et al. .............. 713/190 |
| 2009/0235089 | A1 * | 9/2009 | Ciet et al. ...................... 713/190 |
| 2010/0058301 | A1 * | 3/2010 | Myles et al. .................... 717/142 |
| 2010/0281459 | A1 * | 11/2010 | Betouin et al. ................. 713/190 |
| 2010/0319069 | A1 * | 12/2010 | Granstedt et al. ............... 726/22 |
| 2011/0041178 | A1 * | 2/2011 | Jakobsson et al. .............. 726/22 |
| 2011/0167407 | A1 * | 7/2011 | Betouin et al. ................. 717/120 |
| 2011/0246787 | A1 * | 10/2011 | Farrugia et al. ............... 713/189 |

OTHER PUBLICATIONS

You, "Malware Obfuscation Techniques: A Brief Survey, 2010 International Conference on Broadband, Wireless Computing, Communication and Applications", IEEE Computer Society, 2010, pp. 297-300.*

Mambo, Masahiro et al., "A Tentative Approach to Constructing Tamper-Resistant Software," Proceedings of the 1997 workshop on New security paradigms (NSPW '97), ACM, New York, NY, USA, pp. 23-33.

* cited by examiner

*Primary Examiner* — Andrew L Nalven
*Assistant Examiner* — Walter Malinowski
(74) *Attorney, Agent, or Firm* — Blakely, Sokoloff, Taylor & Zafman LLP (57) ABSTRACT

First source code of a computer program having a plurality of lines of instructions is received. An obfuscation process is performed on the first source code, including at least two of a shuffling operation, a fertilizing operation, an aggregating operation, and a neutralizing operation. Second source code is generated based on the obfuscation process, where the second source code, when executed by a processor, produces an identical result as the first source code.

24 Claims, 10 Drawing Sheets

```
{
    s = in0 + 0x12345678;
    t = in1 + 0x55555555;
    s = 0x00000003 * s;
    s = s ^ 0xffeeddcc;
    t = t + 0x12345678;
    t = 0x00000005 * t;
    t = t ^ 0xffeeddcc;
}
```

FIG. 8A

```
{
    t = in1 + 0x55555555;
    t = t + 0x12345678;
    s = in0 + 0x12345678;
    t = 0x00000005 * t;
    s = 0x00000003 * s;
    s = s ^ 0xffeeddcc;
    t = t ^ 0xffeeddcc;
}
```

FIG. 8B

```
{
    UInt32 newtmp32b0;
    UInt32 newtmp32b1;
    UInt32 newtmp32b2;
    UInt32 newtmp32b3;

t = in1 + 0x55555555;
    t = t + 0x12345678;
    s = in0 + 0x12345678;
    t = 0x00000005 * t;
    newtmp32b0 = s - 0x00000001;
    newtmp32b1 = 0x00000003 * newtmp32b0;
    s = newtmp32b1 + 0x00000003;
    s = s ^ 0xffeeddcc;
    t = t ^ 0xffeeddcc;
}
```

FIG. 8C

```
{
    UInt32 newtmp32b0;
    UInt32 newtmp32b1;
    UInt32 newtmp32b2;
    UInt32 newtmp32b3;

t = in1 + 0x6789ABCD;
    s = in0 + 0x12345678;
    t = 0x00000005 * t;
    newtmp32b0 = s - 0x00000001;
    newtmp32b1 = 0x00000003 * newtmp32b0;
    s = newtmp32b1 + 0x00000003;
    s = s ^ 0xffeeddcc;
    t = t ^ 0xffeeddcc;
}
```

FIG. 8D

```
{
    UInt32 newtmp32b0;
    UInt32 newtmp32b1;
    UInt32 newtmp32b2;
    UInt32 newtmp32b3;

t = in1 + 0x6789ABCD;
    s = in0 + 0x12345678;
    t = 0x00000005 * t;
    newtmp32b0 = s - 0x00000001;
    newtmp32b1 = 0x00000003 * newtmp32b0;
    s = newtmp32b1 + 0x00000003;
    s = s ^ 0xffeeddcc;
    s = s + 0xffddddcc;
    s = s - 0xffddddcc;
    t = t ^ 0xffeeddcc;
}
```

METHOD AND APPARATUS FOR OBFUSCATING PROGRAM SOURCE CODES

FIELD OF THE INVENTION

Embodiments of the present invention relate generally to computer program development. More particularly, embodiments of the invention relate to code obfuscation of computer program source codes.

BACKGROUND

Software publishers often attempt to restrict access to portions of compiled software executables to thwart would-be reverse engineering while still allowing the executables to function properly. Reverse engineering is the practice of dissecting and/or analyzing software to understand how it works. On certain systems, reverse engineering can retrieve information stored within software such as information related to cryptographic keys or copy protection schemes. Reverse engineers can even tamper with the software itself.

Would-be attackers typically have access to the executable code for software and can try to reverse engineer it at their leisure. Those of skill in the art are aware of many approaches to harden a piece of software to such reverse engineering attempts. However, problems with these approaches include rapid growth of source code and increased computational requirements. Such source code can be very difficult to maintain. Further, if an attacker compromises the hardening scheme, the software is difficult to rewrite.

Suppose a software publisher includes proprietary keys, algorithms, and copy protection related information in software for sale or for free. Reverse engineers can quickly obtain legitimate or illegitimate copies of the software and commence testing the software for weaknesses and thereby extract proprietary keys and algorithms.

In modern cryptography, a common methodology is the use of mathematical problems that are believed to be difficult to solve, in order to give bricks to design strong systems. Amongst these problems, one may find the factorization or the discrete logarithm problem. This methodology has been shown to be very efficient, and was one of the key elements to transform the art of cryptography into a real science.

The most important success of basing cryptography on hard problems is the arrival of proven security: with some mathematical proof and rigorous analysis. It is possible to prove certain security features of a scheme, supposing only that these problems resist to algorithms in practice. White box cryptography in general lacks sufficient security compared to regular black box cryptography, where huge improvements were made to support such security in the standard model. It is indeed hard to prove something in the white box cryptography case because attackers have access to internal states or values.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Accordingly, an obfuscation algorithm, including a combination of shuffling, fertilization, aggregation, and neutralizing operations, referred to herein as SFAN, that is efficient to compute and is difficult to reverse (in the area of computing the inverse of a function). SFAN might be used in the white box cryptography domain.

According to some embodiments, an obfuscation tool is utilized to obfuscate computer program source code to obfuscate, by invoking a combination of multiple obfuscating methods, certain characteristics of the source code but maintaining the same functionality (e.g., same behavior or producing same result) of the original source code, generating obfuscated source code. The obfuscating methods may be applied by mixing different methods in different combinations and/or different orders. These methods may be iteratively performed until the difference between the original source code and the obfuscated code exceed a predetermined threshold, which may be user configurable. As a result, when the obfuscated source code is compiled into an executable image, it is more difficult to perform a reverse engineering process to reveal the original source code for security purposes. The obfuscation tool may be implemented as a standalone tool or integrated with a compiler.

According to one embodiment, the obfuscating methods include a shuffling operation, a fertilizing operation, an aggregating operation, and a neutralizing operation. A shuffling operation includes shuffling certain lines of independent instructions, for example, by swapping at least two of the independent instructions. A fertilizing operation includes replacing certain routines or data structures with equivalent routines or data structures (e.g., containing more and different lines of instructions or data members) that will produce the same result as the original source code. An aggregating operation includes compressing or merging some lines of related instructions into fewer lines of instructions, such as, for example, merging some constants used by related instructions (in that case, aggregating can be seen as a kind of optimization process). A neutralizing operation includes adding and/or modifying some lines of instructions, but would not alter the behavior or end result of the original instructions. A neutralizing operation adds one or more operations neutral to operations of the existing code.

Figure 1:
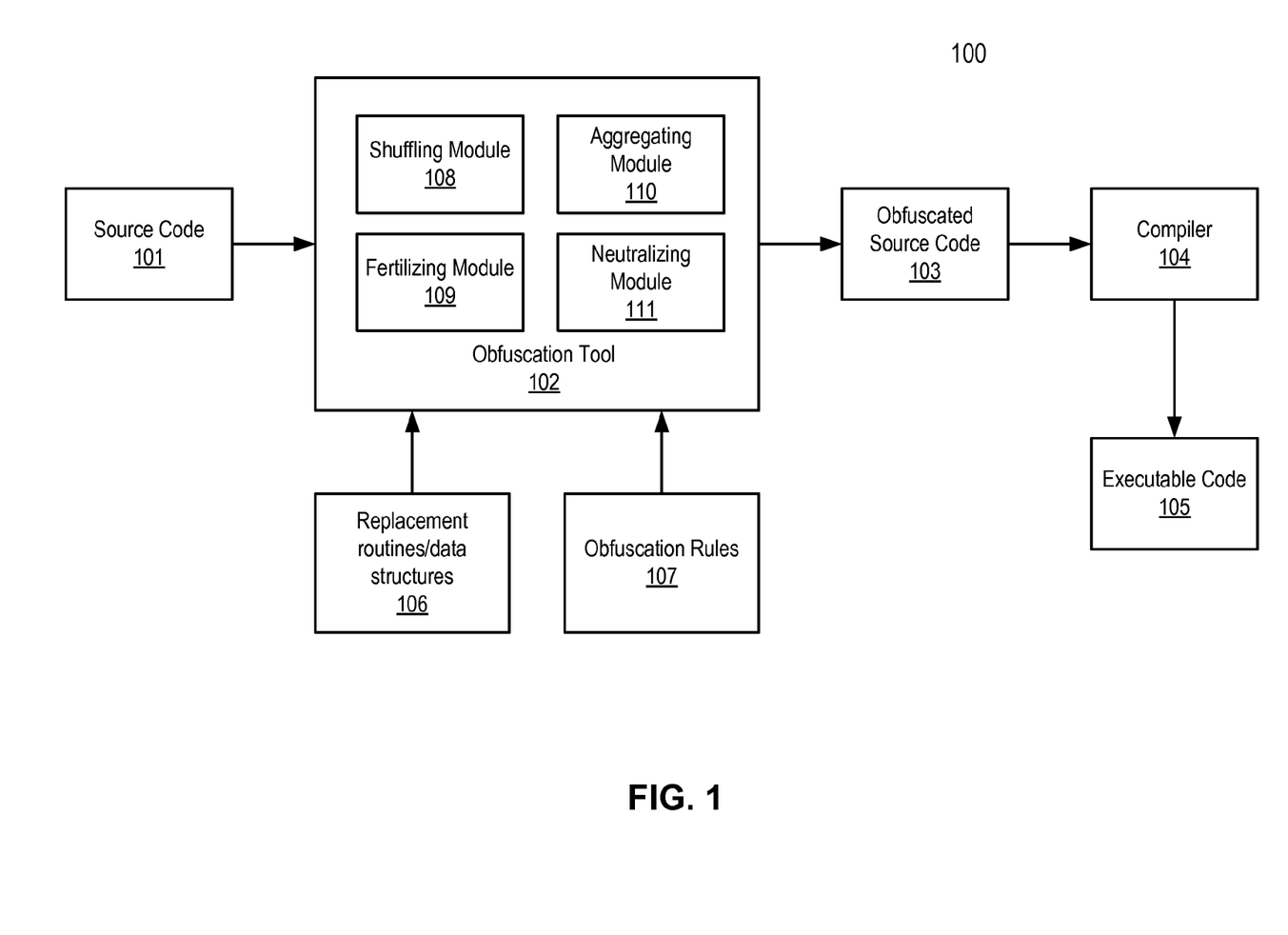
FIG. 1 is a block diagram illustrating a code obfuscation system according to one embodiment of the invention.

FIG. 1 is a block diagram illustrating a code obfuscation system according to one embodiment of the invention. Referring to FIG. 1, system 100 includes, but is not limited to, obfuscation tool 102 to obfuscate original source code 101 and to generate obfuscated source code 103, where obfuscated source code 103 can be compiled by compiler 104 into an executable code 105 that is executable by a processor. Obfuscation tool 102 can be implemented as standalone tool, a plug-in application, and/or integrated with compiler 104. Source code 101 can be written in a variety of programming languages such as C/C++ or Java and compiler 104 can be any kind of compilers.

According to one embodiment, obfuscation tool 102 includes shuffling module 108, fertilizing module 109, aggregating module 110, and neutralizing module 111. Obfuscation tool 102 is utilized to obfuscate source code 101, by invoking a combination of some or all of shuffling module 108, fertilizing module 109, aggregating module 110, and neutralizing module 111, but maintaining the same functionality (e.g., same behavior or producing same result) of original source code 101, generating (via a code generator, not shown) obfuscated source code 103 based on replacement routines and/or data structures 106 and obfuscation rules 107, which may be user configurable. For example, obfuscation tool 102 may further include a lexical analyzer or a semantic analyzer (not shown) to analyze and identify certain target lines for obfuscation based on obfuscation rules 107. The shuffling module 108, fertilizing module 109, aggregating module 110, and neutralizing module 111 may be applied by mixing different modules in different combinations and/or different orders. These modules may be iteratively performed until the difference between the original source code and the obfuscated code exceed a predetermined threshold, which may be user configurable. As a result, when the obfuscated source code 103 is compiled into executable image 105, it is more difficult to perform a reverse engineering process to reveal the original source code 101 for security purposes.

According to one embodiment, shuffling module 108 is to shuffle certain lines of independent instructions, for example, by swapping at least two lines of independent instructions. Fertilizing module is to replace certain routines and/or data structures with equivalent routines or data structures (e.g., containing more and different lines of instructions or data members) that will produce the same result as the original source code. Aggregating module 110 is to compress or merge some lines of related instructions into fewer lines of instructions, such as, for example, merging some constants used by related instructions. Neutralizing module 111 is to add and/or modify some lines of instructions, which when executed will add one or more operations that are neutral to the existing code.

Figure 2:
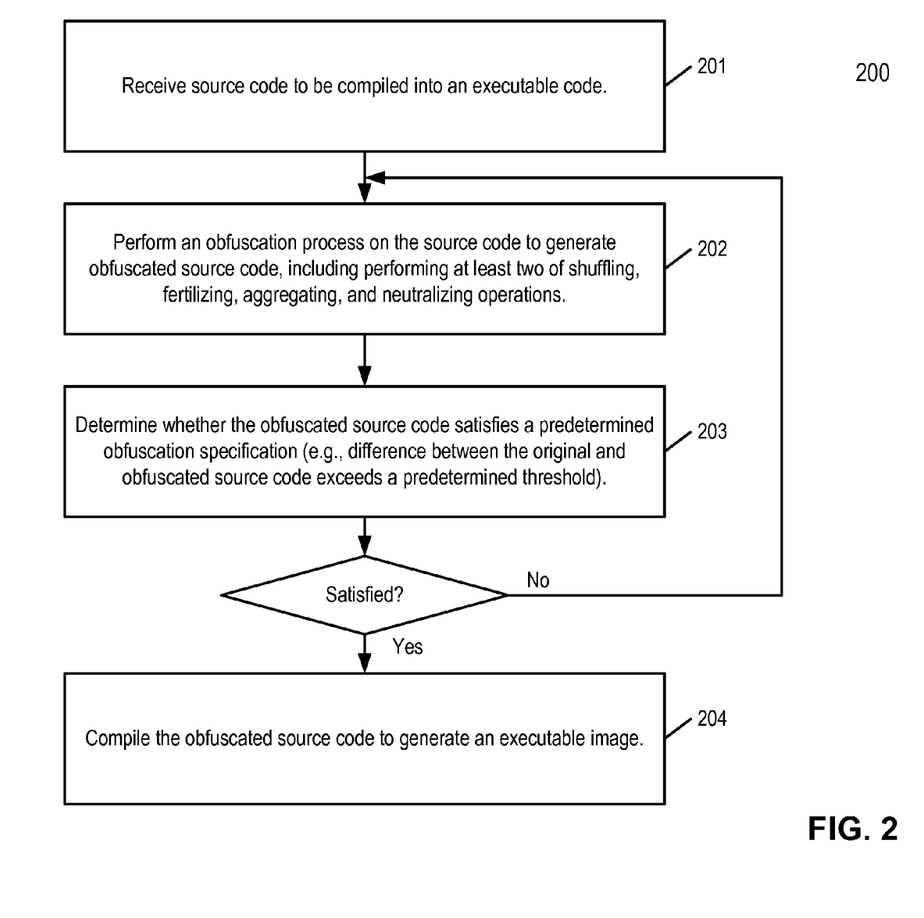
FIG. 2 is a flow diagram illustrating a method for obfuscating source code according to one embodiment of the invention.

FIG. 2 is a flow diagram illustrating a method for obfuscating source code according to one embodiment of the invention. Method 200 may be performed by obfuscation tool 102 of FIG. 1, which may be implemented in software, hardware, or a combination of both. Referring to FIG. 2, at block 201, the obfuscation tool receives source code to be compiled into an executable code. At block 202, the obfuscation tool performs an obfuscation process on the source code to generate obfuscated source code, including performing at least two of a shuffling operation, a fertilizing operation, an aggregating operation, and a neutralizing operation. At block 203, it is determined whether the obfuscated source code satisfies a predetermined obfuscation specification. In one embodiment, it is determined whether a difference between the original source code and the obfuscated source code exceeds a predetermined threshold in order to determine whether the obfuscation specification has been satisfied. If not, the operations of blocks 202-203 may be iteratively performed; otherwise at block 204, the obfuscated source code is compiled to generate an executable image.

According to one embodiment, the purpose of obfuscation is to transform a source code into a more complicated code using an equivalent algorithm or method. However, the transformed code behaves the same as the original code. The equivalent algorithms or methods are to produce the same result given the same input or inputs. In one embodiment, shuffling is an operation which takes lines of instructions and tries to reorder them in a random way without changing the semantic or result of the method represented by the original code. The shuffling operation is to break code structures, i.e., moving lines of code that can be executed before or after. In one embodiment, this means moving independent instructions that can be executed in parallel. Independent instructions refer to those that can be executed in parallel or can be executed in a different order without affecting the end result.

Shuffling is basically the application of tests on at least two lines of code that are independent. A simple example is when the operands of the lines are different. For example, given the following original source code:

$X=X+Y;$ $X=X+Z;$ these two lines of code can be shuffled (e.g., swapped) into the following forms:

$X=X+Z;$ $X=X+Y;$

The same can be applied to other operations such as subtraction, multiplication, division, logical AND, logical XOR, and logical OR, etc.

In another example, given the following original source code:

$X=X\textasciicircum 0x80;$ $X=X|0x7F;$ these two lines are equivalent to the following lines:

$X=X|0x7F;$ $X=X\textasciicircum 0x80;$

Shuffling can also be applied to a block of lines. In general the shuffling produces an output source code of the same length and thus, it can be applied many times without having a significant impact on the performance of the code.

Figure 3:
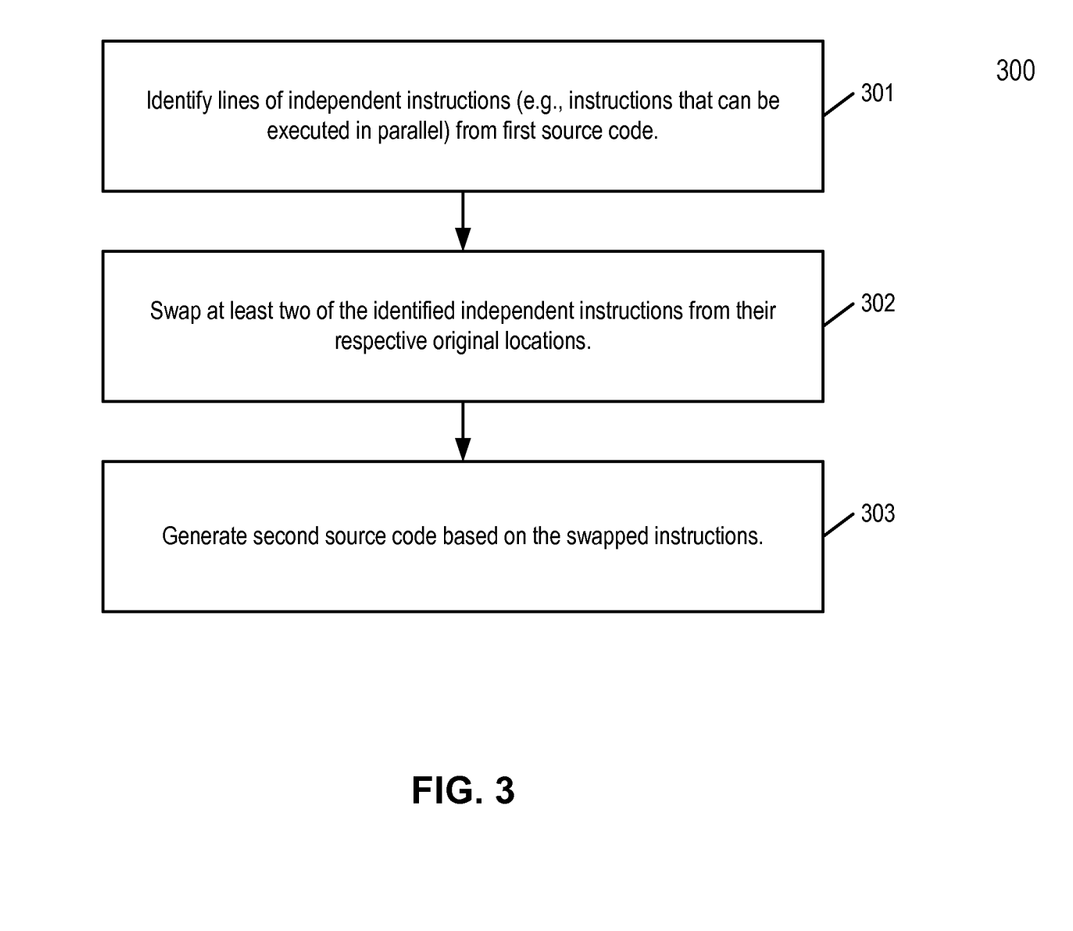
FIG. 3 is a flow diagram illustrating a method for shuffling source code according to one embodiment of the invention.

FIG. 3 is a flow diagram illustrating a method for shuffling source code according to one embodiment of the invention. Method 300 may be performed by shuffling module 108 of FIG. 1. Referring to FIG. 3, at block 301, processing logic identifies lines of independent instructions (e.g., at least two lines of independent instructions), where independent instructions are those can be executed in parallel. At block 302, at least of the identified lines of instructions are swapped from their respective original locations. At block 303, second source code is generated based on the swapped lines of instructions.

According to one embodiment, one algorithm (e.g., represented by lines of code or instructions) can be transformed into another algorithm via fertilizing. The goal of fertilizing is to transform an operation into one or more other operations. The transformed code will have more lines of instructions than the original one, but when executed by a processor, they produce the same result as the original one.

One of goals of the fertilizing operation is to hide certain important source code. For example, an attacker may know that a key will be XORed at some points and try to find the corresponding "^" operation. But if the "^" operation is replaced by other operations such as "+", "&" to compute the equivalent "^" operation via fertilizing, it will be more difficult for the attacker to perform reverse engineering. The fertilization can also be used to break a structure. For example, if there at 16 XORs with key elements that are always be performed in a specific way, via fertilization, these operations can be done in different ways. This breaks many symmetries in the executable image. Even recognizing of very-structured and repetitive algorithms such as the Advanced Encryption Standard (AES) can be made difficult to recognize. Fertilization also voids fingerprinting. For example, if part of the code is used at different places or times (e.g., inlined), after the fertilization, it is very difficult for an attacker to establish the places the same code is used since the code looks completely different. This results in a harder operation for reversing the code and understanding because the attacker has to do this for each piece of the code. Further detailed information concerning fertilizing source code can be found in U.S. patent application Ser. No. 12/434,300, entitled "Systems, Methods, and Computer-Readable Media for Fertilizing Machine-Executable Code," filed May 1, 2009, which is incorporated by reference herein in its entirety.

Figure 4:
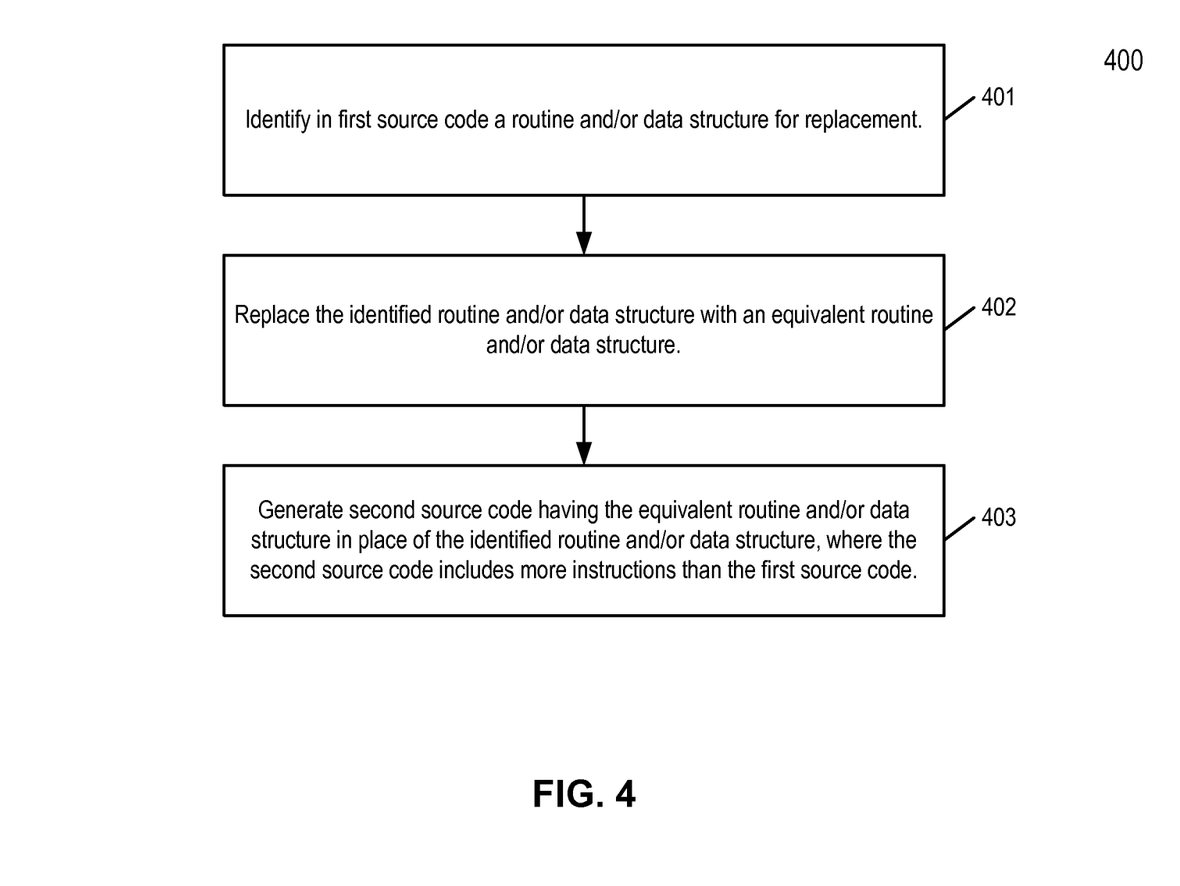
FIG. 4 is a flow diagram illustrating a method for fertilizing source code according to one embodiment of the invention.

FIG. 4 is a flow diagram illustrating a method for fertilizing source code according to one embodiment of the invention. Method 400 may be performed by fertilizing module 109 of FIG. 1, which may be implemented in software, hardware, or a combination of both. Referring to FIG. 4, at block 401, processing logic identifies from first source code a routine and/or a data structure for replacement. At block 402, the identified routine and/or data structure are replaced with an equivalent routine and/or data structure. At block 403, second source code is generated, where the second source code includes the equivalent routine and/or data structure in place of the identified routine and/or data structure. The second source code includes more instructions than the first source code.

According to one embodiment, a process or algorithm represented by source code can be transformed into another equivalent process or algorithm represented by another source code via an aggregation process. Aggregating is basically using some techniques of an optimizer, in order to reduce a number of lines, but they still behave the same as original. In other words, some transformations injected the fertilization or neutralization may be removed by the aggregation process, letting only those that are correctly mixed in the rest of the code. From a practical point of view, this means making some modifications in the code such that the compiler is able to simplify some parts of the code.

For example, given the following lines of code:

$$U = Y \char`\^ secret1;$$

$$V = U \char`\^ secret2;$$

where secret1 and secret2 are two secret constant keys and "U" is never used again. This can be aggregated into the following line:

$$V = Y \char`\^ diffsecret;$$

where the diffsecret=(secret1^secret2) is computed at transcoding time. In this way, the two secrets (secret1 and secret2) from the executable code after the compilation are removed, and only the XOR of the two secrets (diffsecret) is available, which makes an attacker harder to figure out. One of the goals of aggregation is to aggregate constants, i.e., to reduce the number of constants in the program in order to hide the secrets and to reduce the number of lines in the program, for example, to cancel things or to improve efficiency in order to use later new passes which may decrease the efficiency.

Figure 5:
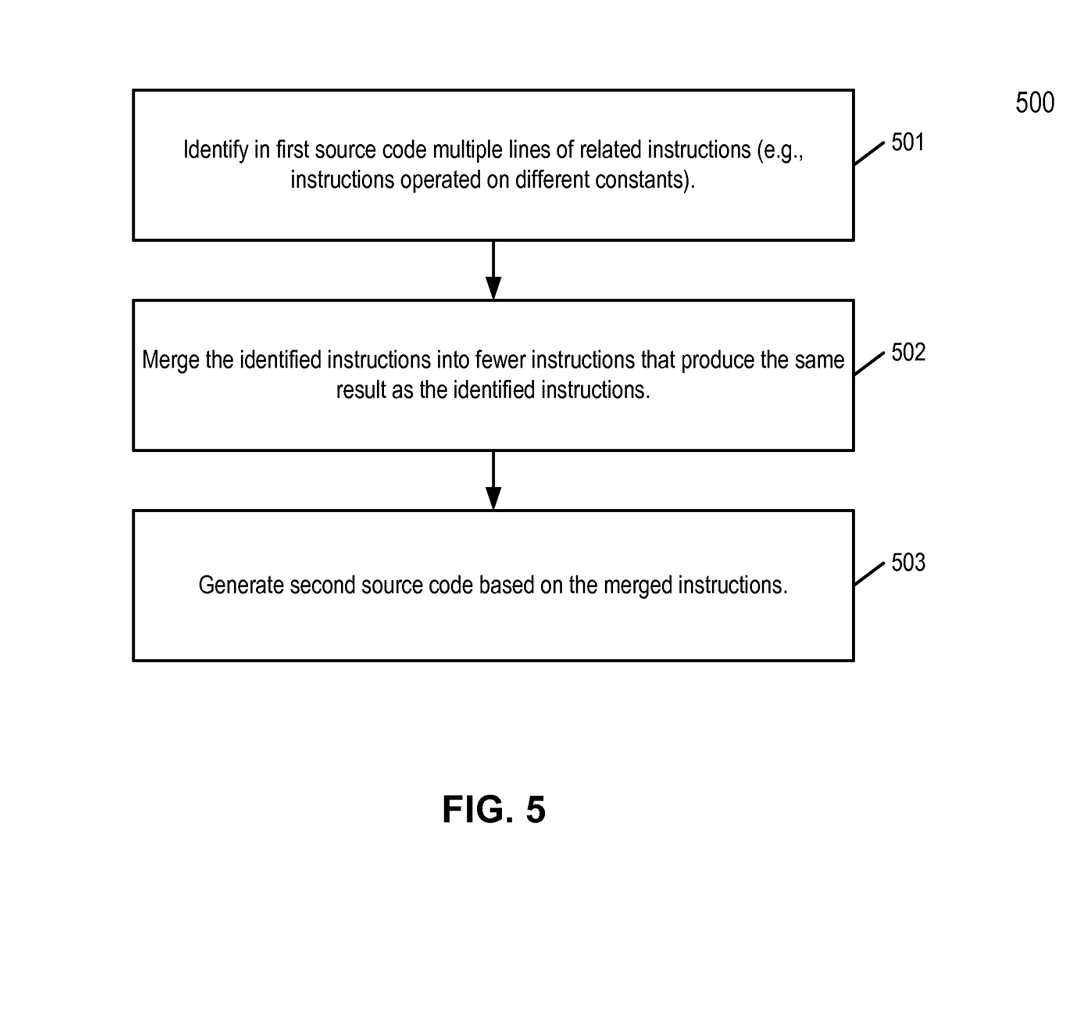
FIG. 5 is a flow diagram illustrating a method for aggregating source code according to one embodiment of the invention.

FIG. 5 is a flow diagram illustrating a method for aggregating source code according to one embodiment of the invention. Method 500 may be performed by aggregating module 110 of FIG. 1, which may be implemented in software, hardware, or a combination of both. Referring to FIG. 5, at block 501, lines of related instructions are identified in first source code. At block 502, at least two of the identified lines of code are merged into fewer lines of code that produce the same result as the original ones. At block 503, second source code is generated based on the merged instructions.

According to one embodiment, an algorithm or process can be transformed into another equivalent algorithm or process by a process of neutralization. Neutralizing is a transformation where some trivial equations of mathematics (tautologies) are used to obfuscate the source code. In one embodiment, the neutralization process is to add one or more operations to the existing code, which when executed, will be neutral to the operations of the existing code. Neutralization can be combined with other processes (e.g., aggregation process) to produce a strong way to improve code from an obfuscation point of view. For example, it is known that X=(X+Y)−Y, or that X=(X*oddConstant)*inverseOfOddConstant, where inverseOfOddConstant is the inverse of oddConstant modulo two to the power of the bitsize of X. Thus, at any time, a value X can be replaced with following two operations with any Y value:

$$X = X + Y;$$

$$X = X - Y;$$

or $$X = X * oddConstant;$$

$$X = X * inverseOfOddConstant;$$

Neutralization can be applied to a more complicated situation such as:

$$X = (X \ \& \ Y) | (X \ \& \ (Y \char`\^ 0xFFFFFFFF))$$

In one embodiment, neutralization modifies the step-by-step semantic of the code. In fact, if neutralization is applied to each operation in the source code, all intermediate registers are modified. For example, instruction of (X=X+a) can be replaced by the following lines of code:

$X=X+M;$ $X=X+a;$ $X=X-M;$

During the execution, only the last value computed of X is the value of X that appears in the first program. This is particularly useful for a long sequence of the same operation. For example, in the AES, there are many five consecutive XORs as follows:

$X=a\ XOR\ b\ XOR\ c\ XOR\ d\ XOR\ e;$

The above instruction can be expanded into the following lines:

$X=M;$ $X=X\ XOR\ a\ XOR\ b\ XOR\ c\ XOR\ d\ XOR\ e;$ $X=X\ XOR\ M;$

One advantage of the neutralization is that it can be used with static or dynamic values, enabling static or dynamic modification of the internal registers. However, it produces longer code. There are types of neutralizations: 1) static neutralization that introduces constants that are recombined; and 2) dynamic neutralization that uses variables and/or registers from the execution that enable ensuring decorrelation of registers and memories.

Figure 6:
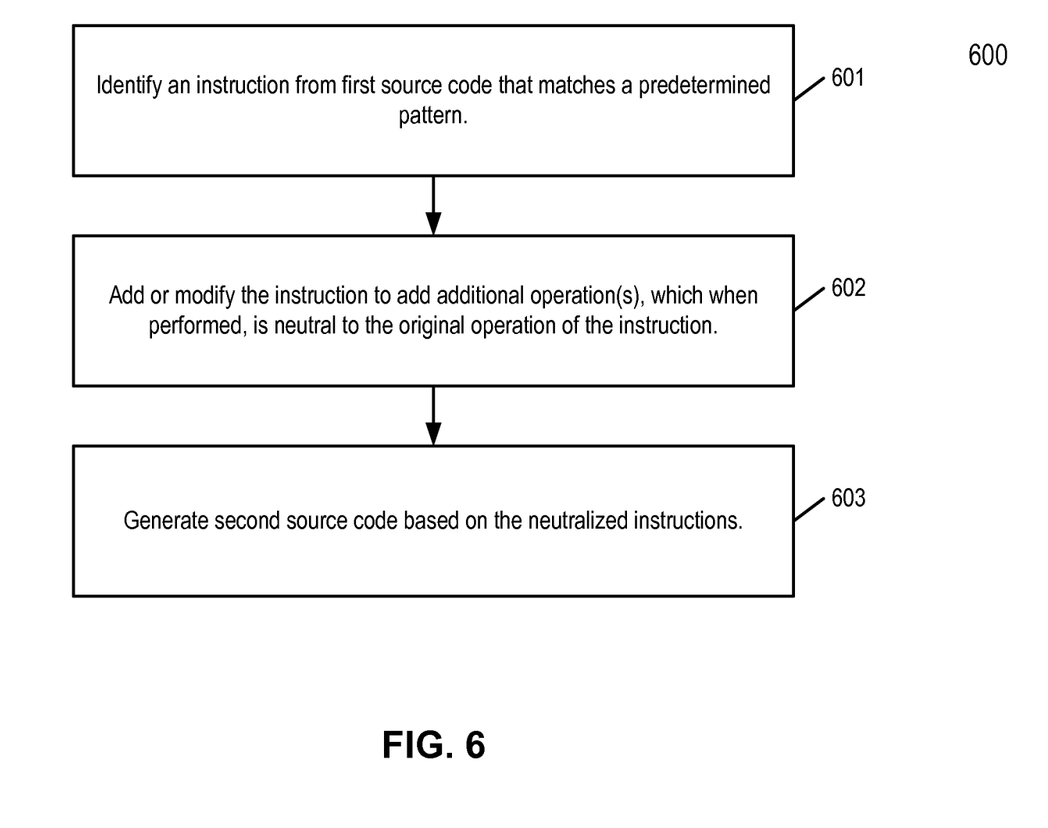
FIG. 6 is a flow diagram illustrating a method for providing additional code neutral to existing source code according to one embodiment of the invention.

FIG. 6 is a flow diagram illustrating a method for providing additional code neutral to existing source code according to one embodiment of the invention. Method 600 may be performed by neutralizing module 111 of FIG. 1, which may be implemented in software, hardware, or a combination of both. Referring to FIG. 6, at block 601, an instruction is identified from first source code that matches a predetermined pattern. At block 602, one or more additional instructions are added or the existing instruction is modified, which when executed, produce the same result as the original instruction. At block 603, second source code is generated based on the modified code.

Figure 7:
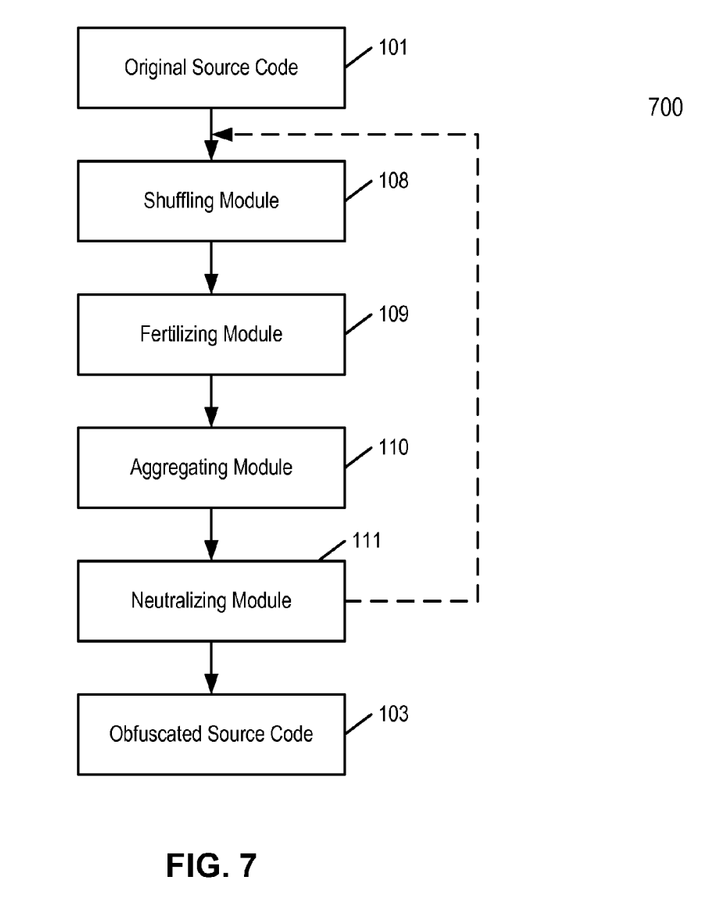
FIG. 7 is a block diagram illustrating an example of a particular obfuscation process according to one embodiment of the invention.
Figure 8A:
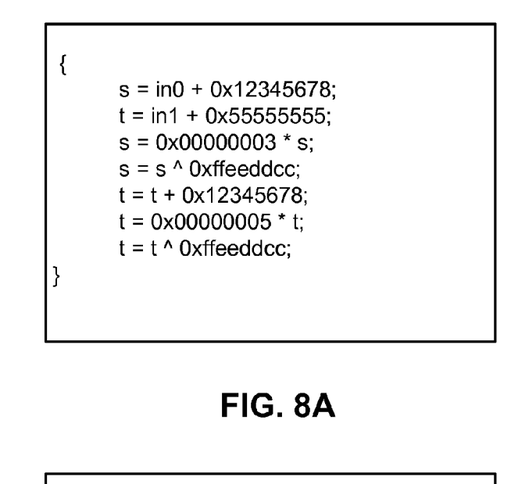
FIGS. 8A-8E are pseudocodes illustrating source code that has been processed by configuration 700 of FIG. 7.
Figure 8B:
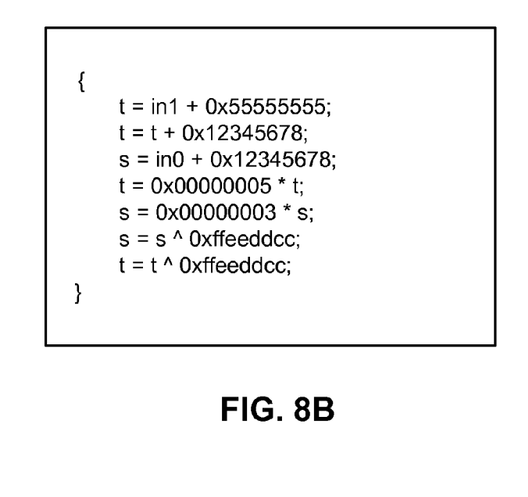
Figure 8C:
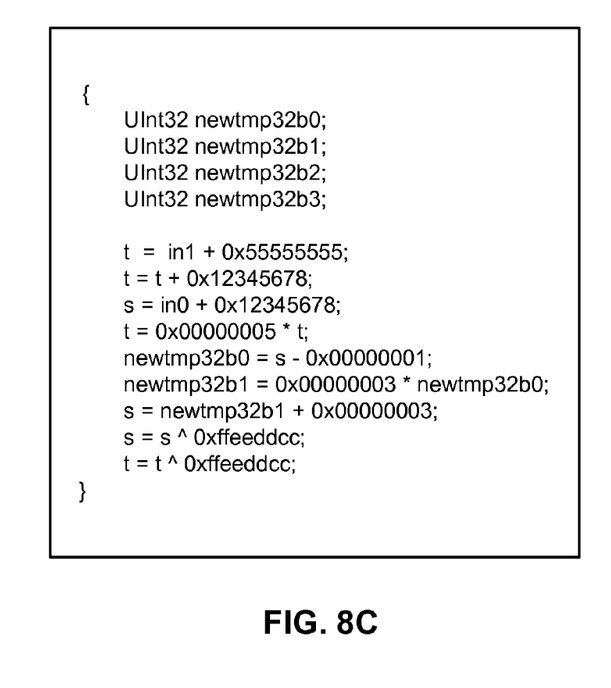
Figure 8D:
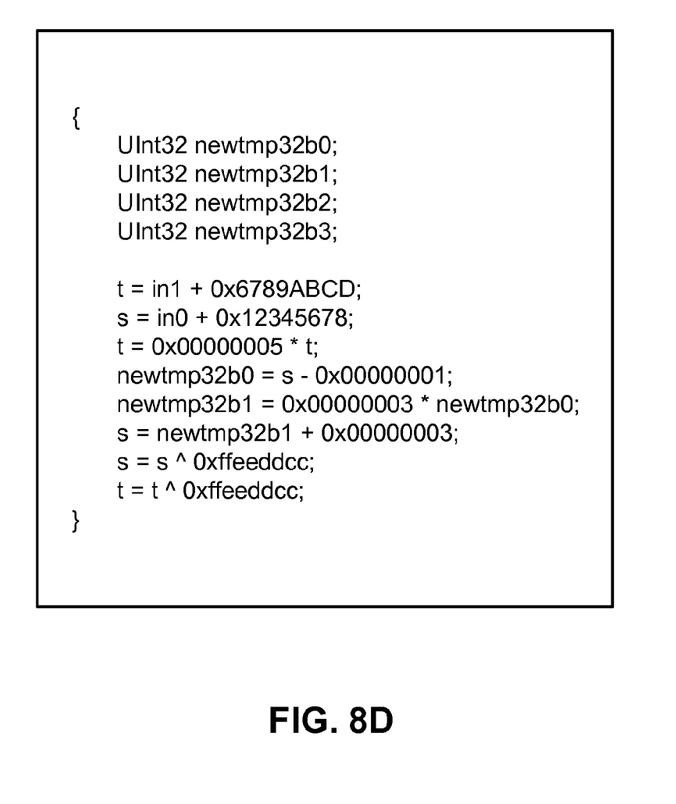
Figure 8E:
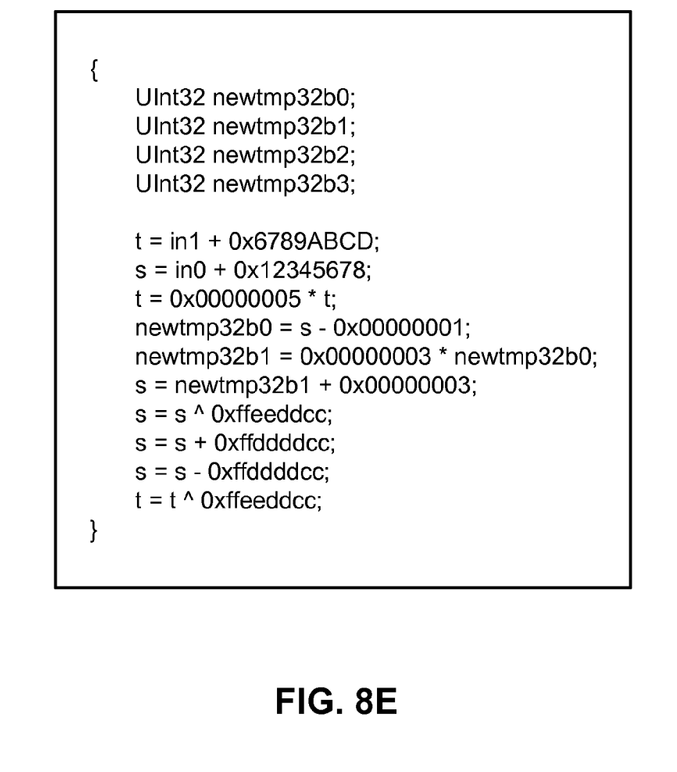

As described above, a shuffling operation, a fertilizing operation, an aggregating operation, and a neutralizing operation can be combined in a random number of times, in a random order, and in a random number of iterations as needed. FIG. 7 is a block diagram illustrating an example of a particular obfuscation process according to one embodiment of the invention. In this example, referring to FIG. 7, shuffling module 108 is chained with fertilizing module 109, aggregating module 110, and neutralizing module 111. FIGS. 8A-8E are pseudocodes illustrating source code that has been processed by configuration 700 of FIG. 7. In this example, FIG. 8A represents the original source code 101. FIG. 8B represents an output generated by shuffling module 108 based on input as shown in FIG. 8A. FIG. 8C represents an output generated by fertilizing module 109 based on input as shown in FIG. 8B. FIG. 8D represents an output generated by aggregating module 110 based on input as shown in FIG. 8C. FIG. 8E represents an output generated by neutralizing module 111 based on input as shown in FIG. 8D.

It is appreciated that embodiments of the invention as described herein can be applied to a variety of programming languages in a variety of software developments. In addition, the techniques described above can be utilized in other engineering design areas, such as electronic design automation.

For example, the techniques described above can be used to obfuscate source code programmed using hardware description language (HDL) or very high speed integrated circuit (VHSIC) HDL (VHDL) in IC designs. Specifically, the HDL/VHDL code can be obfuscated prior to the synthesization process of the IC design.

Figure 9:
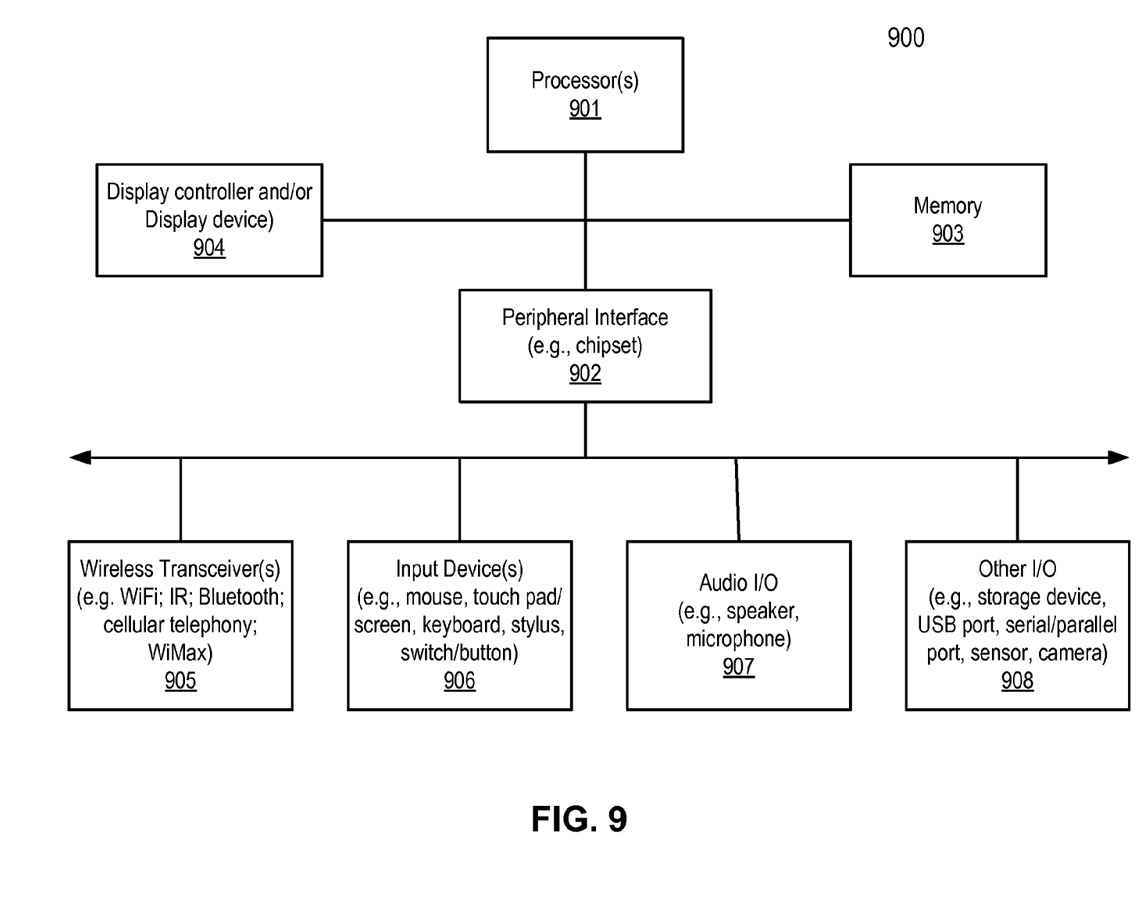
FIG. 9 is a block diagram illustrating an example of a data processing system which may be used with one embodiment of the invention.

FIG. 9 is a block diagram illustrating an example of a data processing system which may be used with one embodiment of the invention. For example, system 900 may represents any of data processing systems described above performing any of the processes or methods described above, such as, for example, system 100 of FIG. 1. System 900 may represent a desktop (e.g., iMac™ available from Apple Inc. of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a personal communicator, a gaming device, a network router or hub, a wireless access point (AP) or repeater, a set-top box, or a combination thereof.

Referring to FIG. 9, in one embodiment, system 900 includes processor 901 and peripheral interface 902, also referred to herein as a chipset, to couple various components to processor 901 including memory 903 and devices 905-908 via a bus or an interconnect. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 901 is configured to execute instructions for performing the operations and steps discussed herein.

Peripheral interface 902 may include memory control hub (MCH) and input output control hub (ICH). Peripheral interface 902 may include a memory controller (not shown) that communicates with a memory 903. Peripheral interface 902 may also include a graphics interface that communicates with graphics subsystem 904, which may include a display controller and/or a display device. Peripheral interface 902 may communicate with graphics device 904 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 901. In such a configuration, peripheral interface 902 operates as an interface chip performing some functions of the MCH and ICH. Furthermore, a graphics accelerator may be integrated within the MCH or processor 901.

Memory 903 may include one or more volatile storage (or memory) devices such as random access memory (RAM), dynamic RAM (DRAM), synchronous DRAM (SDRAM), static RAM (SRAM), or other types of storage devices.

Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 902 may provide an interface to IO devices such as devices 905-908, including wireless transceiver(s) 905, input device(s) 906, audio IO device(s) 907, and other IO devices 908. Wireless transceiver 905 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 907 may include a speaker and/or a microphone to facilitate voice-enabled functions, such as voice recognition, voice replication, digital recording, and/or telephony functions. Other optional devices 908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 9 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for obfuscating computer program code, the method comprising:
   receiving first source code of a computer program having a plurality of lines of instructions;
   performing an obfuscation process on the first source code, including a shuffling operation and at least one of a fertilizing operation, an aggregating operation, and a neutralizing operation, wherein the shuffling operation includes
      identifying from the first source code a first line of source code and a second line of source code that contain independent instructions, and
      swapping locations of the first and second lines of source code from their respective original locations within the first source code; and
   generating second source code based on the obfuscation process, wherein the second source code, when compiled and executed by a processor, produces an identical result as the first source code.

2. The method of claim 1, further comprising compiling the second source code to generate an executable image that is executable by the processor to produce the identical result as the first source code.

3. The method of claim 1, wherein the at least two of the shuffling operation, the fertilizing operation, the aggregating operation, and the neutralizing operation are iteratively performed until a difference between the first source code and the second source code exceeds a predetermined threshold.

4. The method of claim 3, wherein the at least two of the shuffling operation, the fertilizing operation, the aggregating operation, and the neutralizing operation are performed in a random number of time or in a random order during each of the iterations.

5. The method of claim 1,
wherein an independent instruction does not depend from a result of another independent instruction.

6. The method of claim 1, wherein performing a fertilizing operation comprises:
identifying from the first source code a routine or a data structure that matches a predetermined pattern; and
replacing the identified routine or data structure with a predetermined routine or data structure that produces an identical result of the identified routine or data structure, wherein the predetermined routine or data structure includes more lines of instructions than lines of instructions in the identified routine or data structure.

7. The method of claim 1, wherein performing an aggregating operation comprises:
identifying from the first source code a plurality of lines of instructions that are related to each other; and
merging at least two of the identifying lines of related instructions into one or more merged lines of instructions that are fewer than the identified lines of related instructions.

8. The method of claim 1, wherein performing a neutralizing operation comprises:
identifying from the first source code a line of instruction suitable for neutralization based on a predetermined neutralizing policy; and
performing at least one of the following:
adding an additional line of instruction immediately prior to or immediately following the identified line of instruction, and
modifying the identified line of instruction to generate one or more new line of instructions that would produce the same result of the identified line of instruction.

9. A non-transitory computer-readable storage medium having instructions stored therein, which when executed by a computer, cause the computer to perform a method for obfuscating computer program code, the method comprising:
receiving first source code of a computer program having a plurality of lines of instructions;
performing an obfuscation process on the first source code, including a shuffling operation and at least one of a fertilizing operation, an aggregating operation, and a neutralizing operation, wherein the shuffling operation includes
identifying from the first source code a first line of source code and a second line of source code that contain independent instructions, and
swapping locations of the first and second lines of source code from their respective original locations within the first source code; and
generating second source code based on the obfuscation process, wherein the second source code, when compiled and executed by a processor, produces an identical result as the first source code.

10. The computer-readable storage medium of claim 9, wherein the method further comprises compiling the second source code to generate an executable image that is executable by the processor to produce the identical result as the first source code.

11. The computer-readable storage medium of claim 9, wherein the at least two of the shuffling operation, the fertilizing operation, the aggregating operation, and the neutralizing operation are iteratively performed until a difference between the first source code and the second source code exceeds a predetermined threshold.

12. The computer-readable storage medium of claim 11, wherein the at least two of the shuffling operation, the fertilizing operation, the aggregating operation, and the neutralizing operation are performed in a random number of time or in a random order during each of the iterations.

13. The computer-readable storage medium of claim 9,
wherein an independent instruction does not depend from a result of another independent instruction.

14. The computer-readable storage medium of claim 9, wherein performing a fertilizing operation comprises:
identifying from the first source code a routine or a data structure that matches a predetermined pattern; and
replacing the identified routine or data structure with a predetermined routine or data structure that produces an identical result of the identified routine or data structure, wherein the predetermined routine or data structure includes more lines of instructions than lines of instructions in the identified routine or data structure.

15. The computer-readable storage medium of claim 9, wherein performing an aggregating operation comprises:
identifying from the first source code a plurality of lines of instructions that are related to each other; and
merging at least two of the identifying lines of related instructions into one or more merged lines of instructions that are fewer than the identified lines of related instructions.

16. The computer-readable storage medium of claim 9, wherein performing a neutralizing operation comprises:
identifying from the first source code a line of instruction suitable for neutralization based on a predetermined neutralizing policy; and
performing at least one of the following:
adding an additional line of instruction immediately prior to or immediately following the identified line of instruction, and
modifying the identified line of instruction to generate one or more new line of instructions that would produce the same result of the identified line of instruction.

17. An apparatus, comprising:
a processor;
a memory coupled to the processor;
an obfuscation module executed in the memory by the processor to receive first source code of a computer program having a plurality of lines of instructions and to perform an obfuscation process on the first source code, including a shuffling operation and at least one of a fertilizing operation, an aggregating operation, and a neutralizing operation, wherein the shuffling operation includes
identifying from the first source code a first line of source code and a second line of source code that contain independent instructions, and swapping locations of the first and second lines of source code from their respective original locations within the first source code; and a code generator executed in the memory by the processor to generate second source code based on the obfuscation process, wherein the second source code, when compiled and executed by a processor, produces an identical result as the first source code.

18. The apparatus of claim 17, further comprising a compiler to compile the second source code to generate an executable image that is executable by the processor to produce the identical result as the first source code.

19. The apparatus of claim 17, wherein the at least two of the shuffling operation, the fertilizing operation, the aggregating operation, and the neutralizing operation are iteratively performed until a difference between the first source code and the second source code exceeds a predetermined threshold.

20. The apparatus of claim 19, wherein the at least two of the shuffling operation, the fertilizing operation, the aggregating operation, and the neutralizing operation are performed in a random number of time or in a random order during each of the iterations.

21. The apparatus of claim 17,
wherein an independent instruction does not depend from a result of another independent instruction.

22. The apparatus of claim 17, wherein the obfuscation module comprises a fertilizing module to perform the fertilizing operation, including
identifying from the first source code a routine or a data structure that matches a predetermined pattern, and
replacing the identified routine or data structure with a predetermined routine or data structure that produces an identical result of the identified routine or data structure, wherein the predetermined routine or data structure includes more lines of instructions than lines of instructions in the identified routine or data structure.

23. The apparatus of claim 17, wherein the obfuscation module comprises an aggregating module to perform the aggregating operation, including
identifying from the first source code a plurality of lines of instructions that are related to each other, and
merging at least two of the identifying lines of related instructions into one or more merged lines of instructions that are fewer than the identified lines of related instructions.

24. The apparatus of claim 17, wherein the obfuscation module comprises a neutralizing module to perform the neutralizing operation, including
identifying from the first source code a line of instruction suitable for neutralization based on a predetermined neutralizing policy, and
performing at least one of the following:
adding an additional line of instruction immediately prior to or immediately following the identified line of instruction, and
modifying the identified line of instruction to generate one or more new line of instructions that would produce the same result of the identified line of instruction.

* * * * *